(12) United States Patent
Yamaguchi

(10) Patent No.: US 12,002,624 B2
(45) Date of Patent: Jun. 4, 2024

(54) CAPACITOR

(71) Applicant: KYOCERA Corporation, Kyoto (JP)

(72) Inventor: Katsuyoshi Yamaguchi, Kirishima (JP)

(73) Assignee: KYOCERA CORPORATION, Kyoto (JP)

( * ) Notice: Subject to any disclaimer, the term of this patent is extended or adjusted under 35 U.S.C. 154(b) by 81 days.

(21) Appl. No.: 17/784,915

(22) PCT Filed: Dec. 11, 2020

(86) PCT No.: PCT/JP2020/046400
§ 371 (c)(1),
(2) Date: Jun. 13, 2022

(87) PCT Pub. No.: WO2021/131819
PCT Pub. Date: Jul. 1, 2021

(65) Prior Publication Data
US 2023/0020287 A1 Jan. 19, 2023

(30) Foreign Application Priority Data
Dec. 23, 2019 (JP) .................. 2019-231683

(51) Int. Cl.
H01G 4/12 (2006.01)
H01G 4/30 (2006.01)
C04B 35/468 (2006.01)

(52) U.S. Cl.
CPC ............ H01G 4/1227 (2013.01); H01G 4/30 (2013.01); C04B 35/468 (2013.01)

(58) Field of Classification Search
None
See application file for complete search history.

(56) References Cited

U.S. PATENT DOCUMENTS

| 2004/0145856 | A1* | 7/2004 | Nakamura | H01G 4/30 361/311 |
| 2015/0274597 | A1 | 10/2015 | Morigasaki et al. | |
| 2020/0258684 | A1* | 8/2020 | Yun | H01G 4/228 |

FOREIGN PATENT DOCUMENTS

| JP | 2011-132056 A | 7/2011 | |
| JP | 2015-182951 A | 10/2015 | |
| WO | WO-2006103954 A1 * | 10/2006 | ......... C04B 35/4682 |
| WO | 2013/089269 A1 | 6/2013 | |

* cited by examiner

Primary Examiner — Eric W Thomas
(74) Attorney, Agent, or Firm — Volpe Koenig

(57) ABSTRACT

A capacitor body includes a plurality of dielectric layers and a plurality of internal electrode layers stacked alternately. The plurality of dielectric layers include crystal grains of barium titanate, a rare earth element, and silicon. The crystal grains include a first crystal grain and a second crystal grain. The crystal grains each include a surface layer as a shell and an interior portion surrounded by the shell as a core. The first crystal grain has a higher concentration distribution of the rare earth element in the shell than in the core. The second crystal grain has distribution in which a ratio of a concentration of the silicon in the core and the shell is lower than a ratio of a concentration of the rare earth element in the core and the shell in the first crystal grain.

8 Claims, 4 Drawing Sheets

CAPACITOR

FIELD

The present disclosure relates to a capacitor.

BACKGROUND

A known technique is described in, for example, Patent Literature 1.

CITATION LIST

Patent Literature

Patent Literature 1: Japanese Unexamined Patent Application Publication No. 2011-132056

BRIEF SUMMARY

A capacitor according to an aspect of the present disclosure includes a capacitor body including a plurality of dielectric layers and a plurality of internal electrode layers stacked alternately. The plurality of dielectric layers include crystal grains containing barium titanate as a main component, a rare earth element, and silicon. The crystal grains include a first crystal grain and a second crystal grain. The crystal grains each include a surface layer as a shell and an interior portion surrounded by the shell as a core. The first crystal grain has a higher concentration distribution of the rare earth element in the shell than in the core. The second crystal grain has distribution in which a ratio of a concentration of the silicon in the core and the shell is lower than a ratio of a concentration of the rare earth element in the core and the shell in the first crystal grain.

BRIEF DESCRIPTION OF DRAWINGS

The objects, features, and advantages of the present disclosure will become more apparent from the following detailed description and the drawings.

DETAILED DESCRIPTION

A stacked capacitor (hereafter, a capacitor) with the structure that forms the basis of a capacitor according to one or more embodiments of the present disclosure is to be smaller and have higher capacitance and thus includes thinner dielectric layers and internal electrode layers.

Dielectric layers in a known capacitor use a dielectric material containing barium titanate as a main component. In addition to barium titanate, the dielectric layers contain components for adjusting the temperature characteristics of the capacitance or increasing the reduction resistance of the dielectric layers. The capacitor with the structure that forms the basis of the capacitor according to one or more embodiments of the present disclosure includes dielectric layers containing components in addition to barium titanate as different phases and grain boundary phases. The capacitor thus has a lower relative dielectric constant or capacitance due to the different phases and grain boundary phases in the dielectric layers. The applicant has attempted to increase the dielectric constant of the dielectric layers by incorporating the components of the different phases and the grain boundary phases having a low relative dielectric constant into the crystal grains of barium titanate.

A capacitor according to one or more embodiments will now be described with reference to FIGS. 1 to 5. The present disclosure is not limited to the specific embodiments described below. The present disclosure may be embodied in various forms without departing from the spirit or the scope disclosed herein defined by the appended claims.

Figure 1:
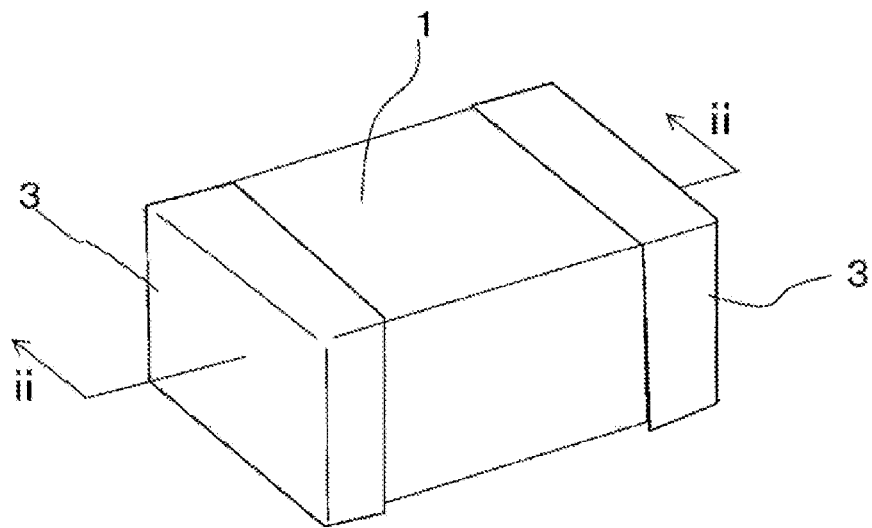
FIG. 1 is an external perspective view of a capacitor according to an embodiment.
Figure 2:
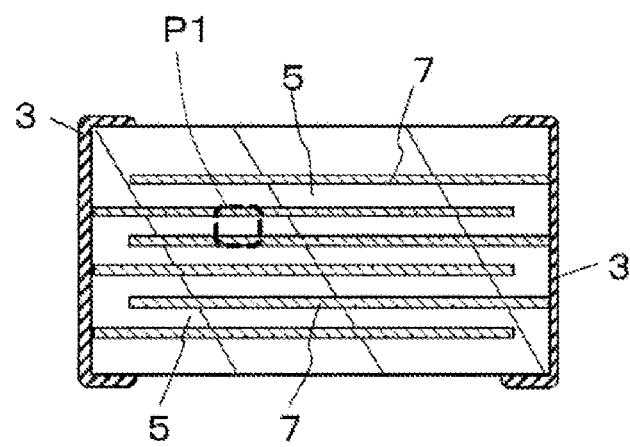
FIG. 2 is a cross-sectional view taken along line ii-ii in FIG. 1.
Figure 3:
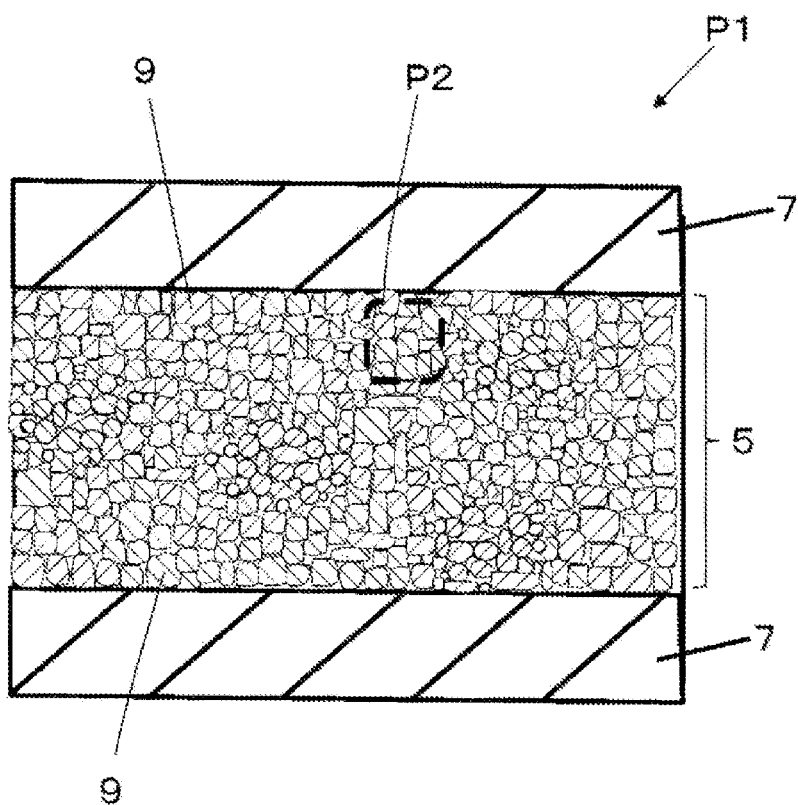
FIG. 3 is an enlarged view of part P1 in FIG. 2.
Figure 4:
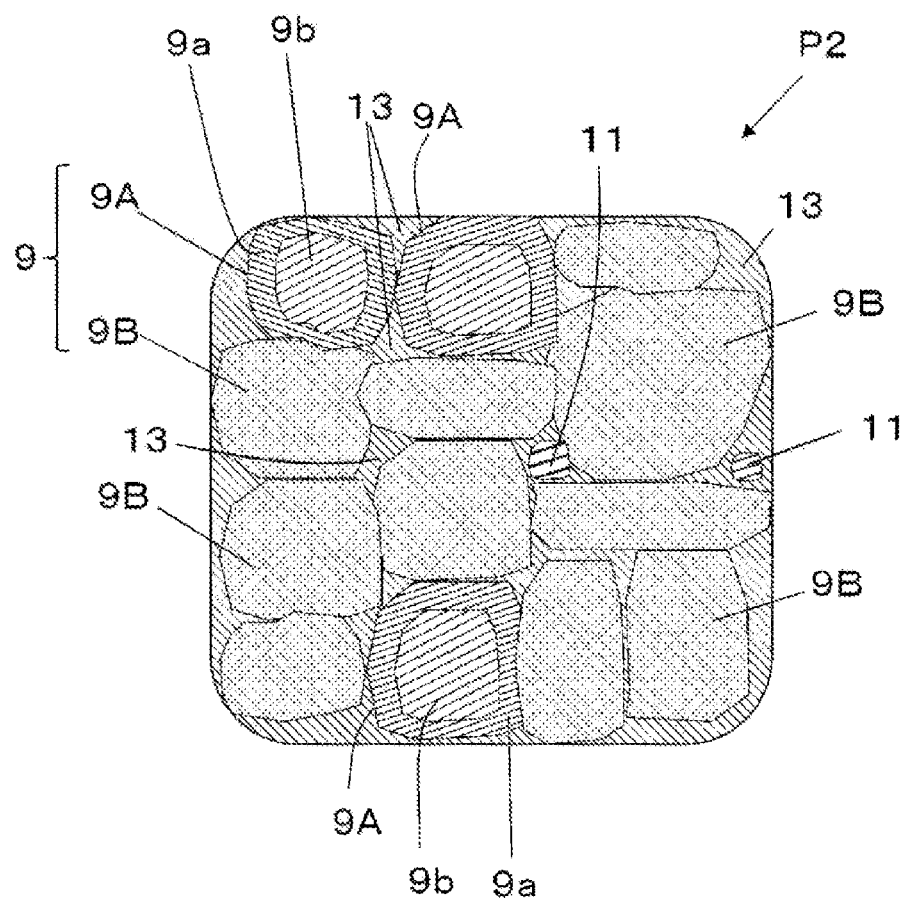
FIG. 4 is an enlarged view of part P2 in FIG. 3.

As shown in FIG. 1, the capacitor according to an embodiment includes a capacitor body 1 and external electrodes 3 on its end faces. As shown in FIG. 2, the capacitor body 1 includes dielectric layers 5 and internal electrode layers 7. The dielectric layers 5 and the internal electrode layers 7 are stacked alternately. Although FIG. 2 shows a stack of several dielectric layers 5 and several internal electrode layers 7 to simplify the drawing, the capacitor body 1 actually includes a stack of several hundred dielectric layers 5 and several hundred internal electrode layers 7. The external electrodes 3 are electrically coupled to the internal electrode layers 7. As shown in FIG. 3, each dielectric layer 5 is a sintered body including crystal grains 9. The main component of the crystal grains 9 is barium titanate. Each dielectric layer 5 is a sintered body mainly including the crystal grains 9 containing barium titanate as a main component. A main component refers to a component with the percentage of 70% or greater by mass of the dielectric layer 5. The dielectric layers 5 mainly including the crystal grains 9 refer to the dielectric layers 5 including the crystal grains 9 with a volume percentage of 70% or greater by mass. A composition mainly including the crystal grains 9 containing barium titanate as a main component may hereafter be referred to as crystal grains 9 of barium titanate. Other components are usually contained as different phases 11 or grain boundary phases 13 between the crystal grains 9 of barium titanate as crystal grains different from the crystal grains 9 of barium titanate. The different phases herein refer to phases determined as crystals through analysis using, for example, X-ray diffraction. The grain boundary phases refer to portions surrounding the crystal grains 9. In this case, the grain boundary phases are defined at interfacial grain boundaries and triple-point grain boundaries. The grain boundary phases tend to include an amorphous phase.

The dielectric layers 5 included in the capacitor according to one or more embodiments include crystal grains 9 of barium titanate and at least a rare earth element (RE) and silicon (Si). The RE refers to an element included in the lanthanide series in the periodic table. In particular, the RE may be, for example, dysprosium (Dy), gadolinium (Gd), terbium (Tb), holmium (Ho), and erbium (Er), or yttrium (Y). The RE is used to increase the reduction resistance and the insulation of the dielectric layers 5. Silicon is used mainly as a sintering aid for the crystal grains 9. Of these components, the crystal grains 9 of barium titanate mainly contribute to a higher dielectric constant of the dielectric layers 5. Phases containing components other than barium titanate tend to have relative dielectric constants that are two to three orders of magnitude lower than the dielectric constant of the crystal grains 9 of barium titanate. The dielectric layers 5 including sintered bodies of the crystal grains 9 have the dielectric properties described below. The relative dielectric constant of the dielectric layers 5 included in the capacitor is determined by the volume mixing ratio of the crystal grains 9, the different phases 11, and the grain boundary phases 13, which indicate individual relative dielectric constants. The relative dielectric constant determined by the volume mixing ratio is herein referred to as a combined dielectric constant. In this case, the dielectric layers 5 having a greater volume percentage of the crystal grains 9 of barium titanate have a higher combined dielectric constant. In other words, the dielectric layers 5 having a greater volume percentage of the different phases 11 and the grain boundary phases 13, which have lower relative dielectric constants than the crystal grains 9 of barium titanate, have a lower relative dielectric constant (combined dielectric constant) in total.

Many of the crystal grains 9 included in the dielectric layers 5 have a core-shell structure. The core-shell structure of the crystal grains 9 is determined by the concentration distribution of the RE contained in the crystal grains 9. In this example, the crystal grains 9 are grouped into crystal grains 9 with the core-shell structure and crystal grains 9 without the core-shell structure. In other words, the dielectric layers 5 include first crystal grains 9A and second crystal grains 9B. The first crystal grains 9A are crystal grains 9 with the core-shell structure. The first crystal grains 9A have a higher concentration distribution of the RE in shells 9a than in cores 9b. The first crystal grains 9A are crystal grains 9 with the core-shell structure based on the concentration distribution of the RE.

The second crystal grains 9B are crystal grains 9 having high concentration distribution of silicon in both the shells 9a, the surface layers of the crystal grains 9, and the interior cores 9b. In other words, the second crystal grains 9B have the distribution in which the ratio of the silicon concentration in the shells 9a and the cores 9b is less than the ratio of the RE concentration in the shells 9a and the cores 9b in the first crystal grains 9A.

In the dielectric layers 5, much of silicon reaches the interiors of the crystal grains 9 of barium titanate to form a solid solution. The dielectric layers 5 thus have a lower volume percentage of the different phases 11 or the grain boundary phases 13 resulting from silicon than known dielectric layers 5. This increases the combined dielectric constant of the dielectric layers 5, thus increasing the capacitance of the capacitor. The capacitor according to one or more embodiments can also increase its insulation resistance at high temperatures. In this case, high temperatures refer to, for example, 100° C. or higher. More specifically, the capacitor has high insulation resistance at 125° C.

The first crystal grains 9A have a Csr-CCr ratio of 2 to 20 inclusive, where Csr is the concentration of the RE contained in the shells 9a and Ccr is the concentration of the RE contained in the cores 9b. The second crystal grains 9B have a Css-Ccs ratio of 1 to 1.5 inclusive, where Css is the concentration of silicon contained in the shells 9a and Ccs is the concentration of silicon contained in the cores 9b. In this case, the dielectric layers 5 included in the capacitor according to one or more embodiments may include 80% or greater, or specifically, 90% or greater of the second crystal grains 9B in terms of the ratio of the number of grains.

Figure 5:
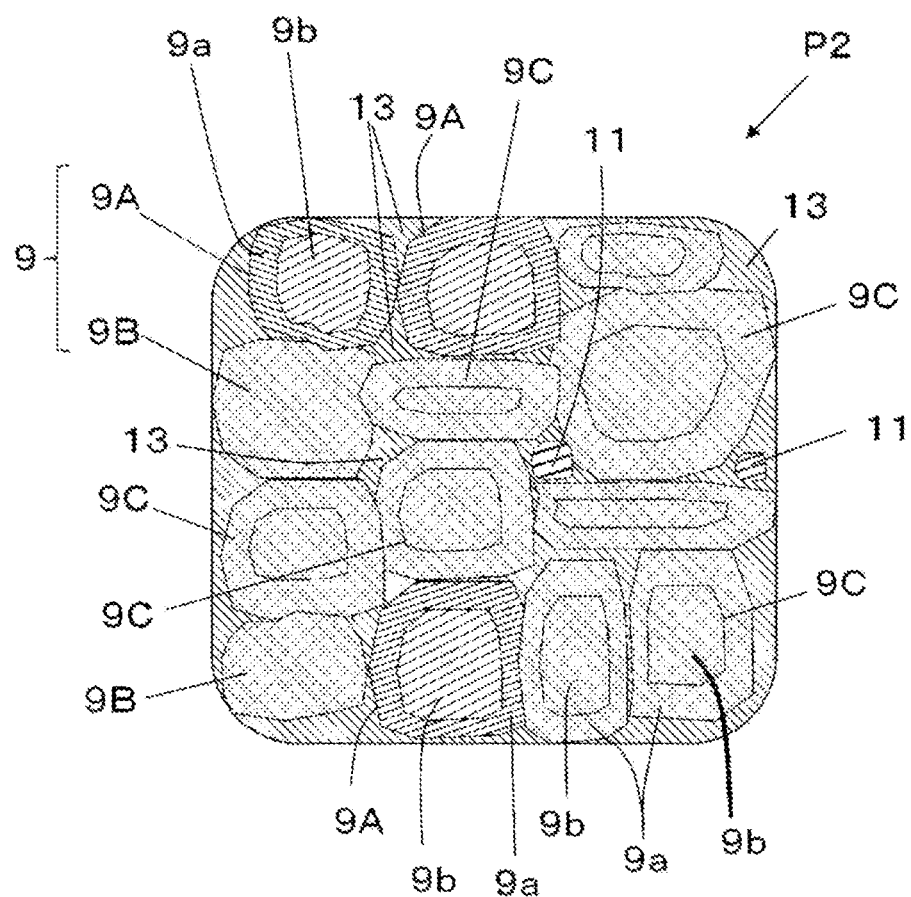
FIG. 5 is a partial schematic cross-sectional view of a dielectric layer included in a capacitor according to another embodiment.

FIG. 5 is a partial schematic cross-sectional view of a dielectric layer included in a capacitor according to another embodiment. The dielectric layer 5 shown in FIG. 5 includes crystal grains 9 containing an RE element and silicon. In other words, the dielectric layer 5 shown in FIG. 5 includes crystal grains (third crystal grains 9C) that do not have the core-shell structure based on the concentration distribution of silicon, but have the core-shell structure based on the concentration distribution of the RE.

In other words, the third crystal grains 9C are crystal grains of the second crystal grains 9B determined as having a higher concentration distribution of the RE in the shells 9a than in the cores 9b when the concentration distribution of the RE is evaluated for the second crystal grains 9B. In this case, the second crystal grains 9B are crystal grains 9 that have the concentration distribution of silicon described above alone without the core-shell structure of the RE. In this case, the dielectric layers 5 may include 80% or greater of the third crystal grains 9C in terms of the ratio of the number of grains.

In the capacitor according to one or more embodiments, all the dielectric layers 5 in the capacitor body 1 may include at least the second crystal grains 9B or the third crystal grains 9C. All the dielectric layers 5 herein refer to all the dielectric layers 5 that contribute to capacitance charging in the capacitor. In other words, all the dielectric layers 5 refer to the portion of the capacitor body 1 excluding a cover layer. In this case, all the dielectric layers 5 that contribute to capacitance charging in the capacitor body 1 may include the first crystal grains 9A.

A method for observing and evaluating the above composition of the dielectric layers 5 will now be described. In the capacitor body 1, the state of the dielectric layers 5 and the internal electrode layers 7 stacked on one another or the density the crystal grains 9 is evaluated by observation and photographing using a digital microscope or an electron microscope. The compounds of the crystal grains 9 included in the dielectric layers 5 are identified by X-ray diffraction and electron diffraction using a transmission electron microscope. In the measurement of the elements contained in the crystal grains 9 in the dielectric layers 5, characteristic X-rays are measured using an analyzer (energy dispersive analyzer) attached to the transmission electron microscope. The concentrations of the elements contained in the shells 9a and the cores 9b in the crystal grains 9 are also measured using the analyzer attached to the transmission electron microscope. In this case, the intensities (counts) of the characteristic X-rays generated by the RE and silicon contained in the shells 9a and the cores 9b are determined as Csr, Ccr, Css, and Ccs. The Csr-Ccr ratio, or the ratio of the intensity Csr of the characteristic X-rays of the RE in the shells 9a to the ratio of the intensity Ccr of the characteristic X-rays of the RE in the cores 9b, is then calculated. The Css-Ccs ratio, or the ratio of the intensity Css of the characteristic X-rays of silicon in the shells 9a to the ratio of the intensity Ccs of the characteristic X-rays of silicon in the cores 9b, is calculated. The first crystal grains 9A, the second crystal grains 9B, and the third crystal grains 9C are identified based on the obtained elemental intensities Csr-Ccr and Css-Ccs to determine the number of grains. In this case, the crystal grains 9 to be analyzed have a maximum diameter of 0.1 µm or greater. When the crystal grains 9 have a maximum diameter of 0.1 µm or smaller, the state of the concentration distribution of the RE contained in the crystal grains 9 is unclear. This may cause difficulty in evaluating the core-shell structure in the crystal grains 9. In each crystal grain 9, the boundary between the shell 9a and the core 9b is, for example, the region in which the intensity of the characteristic X-rays in the shell 9a relative to the intensity of the characteristic X-rays in the core 9b changes greatly when the concentration distribution of REs is measured. At such boundaries, the crystal structure changes from a cubic crystal system to a pseudo-cubic crystal system. Such analysis is performed using a specific cross-section of a dielectric layer 5. The cross section covers an area in which crystal grains 9 are connected. In this case, the number of crystal grains 9 is 10 to 100 inclusive. The analysis is performed on one to ten dielectric layers 5 in the middle of the capacitor body 1 in the stacking direction. However, all the dielectric layers 5 in the capacitor body 1 may be analyzed as appropriate. In this case, the middle portions of the dielectric layers 5 in the width direction are analyzed.

The dielectric layers 5 included in the capacitor according to one or more embodiments may contain magnesium (Mg) and manganese (Mn) in addition to the above components. Mg is used to adjust the temperature characteristics of the capacitance of the capacitor. Mn is used to increase the reduction resistance of the dielectric layers 5. The dielectric layers 5 may further contain sintering aids such as a glass powder containing silicon oxide with other elements as appropriate.

A method for manufacturing the capacitor according to one or more embodiments will now be described. The capacitor according to one or more embodiments may be fabricated with a known manufacturing method, except for using a calcined powder described below for ceramic green sheets to be the dielectric layers 5. In this case, the calcined powder is prepared by mixing a barium titanate powder and silicon components (powder containing silicon oxide) and then calcining the mixture. Use of such a calcined powder as a raw material powder causes silicon to easily reach the grain interiors of the barium titanate powder to form a solid solution. To change the percentage of the number of crystal grains 9 having silicon reaching the grain interiors and forming a solid solution, a varied amount of powder containing silicon oxide is added to the barium titanate powder.

EXAMPLES

Capacitors were fabricated, and their characteristics were evaluated. A barium titanate ($BaTiO_3$) powder, a magnesium carbonate ($Mg_2CO_3$) powder, a dysprosium oxide ($Dy_2O_3$) powder, a manganese carbonate ($MnCO_3$) powder, and a sintering aid powder (with 55 mol % of $SiO_2$, 20 mol % of BaO, 15 mol % of CaO, and 10 mol % of $Li_2O_3$) were first prepared as a powdery raw material of a dielectric powder. As the barium titanate powder, a barium titanate powder with a mean particle size of 0.25 μm was used. The dielectric powder includes 0.8 moles of the magnesium oxide (MgO) powder in terms of MgO, 0.8 moles of the dysprosium oxide ($Dy_2O_3$) powder, and 0.3 moles of the manganese carbonate ($MnCO_3$) powder in terms of MnO added to 100 moles of the barium titanate powder. One part by mass of the sintering aid powder ($SiO_2$—BaO—CaO glass powder) was added to 100 parts by mass of the barium titanate powder. In this example, the sintering aid powder was pre-added to the barium titanate powder at a predetermined ratio (0.3 to 0.5) to the total amount of the glass component to be added. The resultant barium titanate powder was then calcined at 800° C. for two hours in the atmosphere to prepare a calcined powder.

Slurry was then prepared by adding the remaining additives to the calcined powder and mixing the powder into an organic vehicle. The remaining additives are the MgO powder, the $Dy_2O_3$ powder, the $MnCO_3$ powder, and the sintering aid powder.

The prepared slurry was then used to form ceramic green sheets with an average thickness of 5 μm by doctor blading. A butyral resin was added to the organic vehicle. The amount of the butyral resin added was 10 parts by mass with respect to 100 parts by mass of the dielectric powder. A solvent containing a mixture of ethyl alcohol and toluene at a ratio of 1:1 was used. Ceramic green sheets with the same thickness were also formed without using the calcined powder. A conductive paste containing a nickel powder was used for forming internal electrode patterns.

The conductive paste was printed on the resultant ceramic green sheets to obtain patterned sheets. The patterned sheets obtained with the ceramic green sheets formed using the calcined powder are referred to as first sheets. The patterned sheets obtained with the ceramic green sheets formed without the calcined powder are referred to as second sheets.

Subsequently, 10 sheets of the resultant first and second sheets were stacked in combination as a core laminate. The ceramic green sheets as cover layers were then placed on the upper surface and the lower surface of the core laminate to obtain a base laminate. For the cover layers, ceramic green sheets formed without the calcined powder were used. The base laminate was then cut into capacitor body compacts.

The capacitor body compacts were fired to obtain capacitor bodies. The capacitor bodies were fired with a temperature rise rate of 900° C./h and a maximum temperature of 1190° C. in hydrogen-nitrogen. A sintering furnace using a resistance heating method was used in the firing. The capacitor bodies were then reoxidized. The capacitor bodies were reoxidized at a maximum temperature of 1000° C. and a retention time of five hours in a nitrogen atmosphere. The capacitor bodies each have dimensions of 1×0.5×0.5 mm. The dielectric layers have an average thickness of 3 μm. The internal electrode layers have an average thickness of 1 μm. Ten layers were stacked. The resultant capacitors have a capacitance of 10 nF, which is a designed value.

After the capacitor bodies were barrel-polished, an external electrode paste was applied to the two ends of each capacitor body. The capacitor bodies were then thermally treated at 800° C. to form external electrodes. The external electrode paste containing a Cu powder and glass were used. The surfaces of the external electrodes were then plated with Ni and then Sn using an electrolytic barrel machine to complete the capacitors.

The fabricated capacitors were evaluated in the manner described below. Several of the fabricated capacitors were first selected and ground using a mortar to prepare samples for X-ray diffraction. The prepared samples were then analyzed using X-ray diffraction to identify the main components contained in the dielectric layers.

The crystal grains included in the dielectric layers were then analyzed. In this analysis, capacitor samples were processed as described below. The cross section of each capacitor was first polished to prepare a sample with the cross section being exposed as shown in FIG. 2. The sample with the exposed cross section underwent focused ion beam (FIB) processing to be a sample for observation with a transmission electron microscope.

The analysis and evaluations described below were then performed on the prepared samples using a transmission electron microscope including an analyzer. From a photograph obtained through observation with a transmission electron microscope, a cross section including one dielectric layer as shown in FIG. 3 was first selected. The area used as a unit area is a W cross section of one dielectric layer. The W cross section of the capacitor refers to a cross section in the direction parallel to the end faces of the capacitor body on which the external electrodes are formed. The selected layer is one dielectric layer in the middle of the capacitor body in the stacked direction in the cross section of the capacitor body. The middle portion of the selected dielectric layer in the width direction was analyzed. The analysis was performed on crystal grains included in an area of 3×3 μm. The analysis was performed at three locations.

The components contained in the crystal grains included in the selected one dielectric layer was then identified. The result of the analysis showed that a base phase mainly contains barium titanate. The samples prepared from the capacitors fabricated using the calcined powder, of the capacitors fabricated, all contained the first crystal grains and the second crystal grains in the dielectric layers. The dielectric layers included in the fabricated capacitors also included crystal grains that can be determined as the third crystal grains. Specific crystal grains showed the core-shell structure when undergoing evaluation of the concentration distribution of the RE. For each of the crystal grains identified as the first crystal grain, the Csr-Ccr ratio, or the ratio of the concentration Csr of the RE in the shells to the ratio of the concentration Ccr of the RE in the cores, was in the range of 7 to 8. The concentration distribution of silicon in the crystal grains identified as the first crystal grains was also high in the interior of the crystal grains. For each of the crystal grains identified as the second crystal grain, the Css-Ccs ratio, or the ratio of the silicon concentration Css in the shells to the ratio of the silicon concentration Ccs in the cores, was 1.5.

For dielectric properties, capacitance was measured under the condition of no direct-current (DC) voltage application. Under the condition of no DC voltage application, an alternating-current (AC) voltage of 1.0 V with a frequency of 1 kHz was used. Thirty samples underwent the measurement, and the average was calculated. Table 1 shows the measured capacitance of each sample. The insulation resistance at high temperatures was also measured. The temperature was set at 125° C. The insulation resistance at high temperatures was determined by applying a DC voltage (100 V) to the prepared samples (capacitors) in a thermostatic oven for one minute. Twenty samples underwent the measurement, and the average was calculated. Samples including layers all formed from ceramic green sheets without using the calcined powder were also prepared and evaluated in the same manner. Each of the crystal grains in the dielectric layers of the samples including the layers all formed from ceramic green sheets without using the calcined powder had the core-shell structure based on the concentration distribution of the RE. However, no crystal grain that contains silicon reaching the grain interiors to form a solid solution was observed. Crystal grains observed with a signal with a level of a measurement error were excluded.

The results in Table 1 show that the samples with the second crystal grains included in the dielectric layers (sample Nos. 2 to 4) have higher capacitance than the samples without the second crystal grains included in the dielectric layers (sample No. 1). The samples with the second crystal grains also have higher insulation resistance at high temperatures. The results from X-ray diffraction and observations by transmission electron microscopy performed on the dielectric layers of each sample show that sample Nos. 2 to 4 have a smaller percentage of the different phases and grain boundary phases than sample No. 1. Of the samples with the second crystal grains in the dielectric layers (samples No. 2 to 4), the samples including 80% of the second crystal grains in the dielectric layers in terms of the ratio of the number of grains (sample Nos. 3 and 4) have higher capacitance and higher insulation resistance at high temperatures than the sample including 50% of the second crystal grains in the dielectric layers in terms of the ratio of the number of grains (sample No. 2). Additionally, the sample (sample No. 4) including the layers in the capacitor body all formed from the first sheet (ceramic green sheet formed using the calcined powder) has higher capacitance and higher insulation resistance at high temperatures than the sample (sample No. 3) including half the number of layers formed from the first sheet.

The present disclosure may be implemented in the following forms.

A capacitor according to one or more embodiments of the present disclosure includes a capacitor body including a plurality of dielectric layers and a plurality of internal electrode layers stacked alternately. The plurality of dielectric layers include crystal grains containing barium titanate as a main component, a rare earth element, and silicon. The crystal grains include a first crystal grain and a second crystal grain. The crystal grains each include a surface layer as a shell and an interior portion surrounded by the shell as a core. The first crystal grain has a higher concentration distribution of the rare earth element in the shell than in the core. The second crystal grain has distribution in which a ratio of a concentration of the silicon in the core and the shell is lower than a ratio of a concentration of the rare earth element in the core and the shell in the first crystal grain.

Although the embodiments of the present disclosure have been described in detail, the present disclosure is not limited to the above embodiments, and may be modified or changed variously without departing from the spirit and scope of the present disclosure. The components described in the above embodiments may be entirely or partially combined as appropriate unless any contradiction arises.

REFERENCE SIGNS LIST 1 capacitor body
3 external electrode
5 dielectric layer
7 internal electrode layer
9 crystal grain
9A first crystal grain

TABLE 1

| Sample No. | Calcined powder | Ratio of silicon oxide-containing powder added to calcined powder (ratio to the maximum amount to be added: by mass) — | The number of layers of first sheet (calcined powder used) Layer(s) | The number of layers of second sheet (calcined powder unused) Layer(s) | First crystal grain | Second crystal grain | Third crystal grain | The ratio of the number of second crystal grains % | Capacitance nF | Insulation resistance at high temperatures $\Omega(\times 10^9)$ |
|---|---|---|---|---|---|---|---|---|---|---|
| 1 | Unused | 0 | 0 | 10 | Observed | Not observed | Not observed | 0 | 10 | 3 |
| 2 | Used | 0.3 | 5 | 5 | Observed | Observed | Observed | 50 | 10.5 | 3.2 |
| 3 | Used | 0.5 | 5 | 5 | Observed | Observed | Observed | 80 | 11 | 3.5 |
| 4 | Used | 0.5 | 10 | 0 | Observed | Observed | Observed | 80 | 11.5 | 5.2 |

9B second crystal grain
9a shell
9b core
11 different phase
13 grain boundary phase

The invention claimed is:

1. A capacitor, comprising:
a capacitor body including a plurality of dielectric layers and a plurality of internal electrode layers stacked alternately,
the plurality of dielectric layers including crystal grains comprising barium titanate as a main component, a rare earth element, and silicon,
the crystal grains including a first crystal grain a second crystal grain,
the crystal grains each including a surface layer as a shell and an interior portion surrounded by the shell as a core,
the first crystal grain having a higher concentration distribution of the rare earth element in the shell than in the core,
the second crystal grain having
a higher concentration distribution of the rare earth element in the shell than in the core, and
a distribution in which a ratio of a concentration of the silicon in the core and the shell is lower than a ratio of a concentration of the rare earth element in the core and the shell in the first crystal grain.

2. The capacitor according to claim 1, wherein the capacitor body includes the plurality of dielectric layers each including the second crystal grain.

3. The capacitor according to claim 1, wherein the first crystal grain has a Csr-Ccr ratio of 2 to 20 inclusive, the Csr being a concentration of the rare earth element contained in the shell, the Ccr being the concentration of the rare earth element contained in the core.

4. The capacitor according to claim 1, wherein the second crystal grain has a Css-Ccs ratio of 1 to 1.5 inclusive, the Css being a concentration of silicon contained in the shell, the Ccs being a concentration of silicon contained in the core.

5. A capacitor, comprising:
a capacitor body including a plurality of dielectric layers and a plurality of internal electrode layers stacked alternately,
the plurality of dielectric layers including crystal grains comprising barium titanate as a main component, a rare earth element, and silicon,
the crystal grains including a first crystal grain a second crystal grain,
the crystal grains each including a surface layer as a shell and an interior portion surrounded by the shell as a core,
the first crystal grain having a higher concentration distribution of the rare earth element in the shell than in the core,
the second crystal grain having a distribution in which a ratio of a concentration of the silicon in the core and the shell is lower than a ratio of a concentration of the rare earth element in the core and the shell in the first crystal grain, wherein
the plurality of dielectric layers include 80% or greater of the second crystal grain in terms of a ratio of the number of grains.

6. The capacitor according to claim 5, wherein the capacitor body includes the plurality of dielectric layers each including the second crystal grain.

7. The capacitor according to claim 5, wherein the first crystal grain has a Csr-Ccr ratio of 2 to 20 inclusive, the Csr being a concentration of the rare earth element contained in the shell, the Ccr being the concentration of the rare earth element contained in the core.

8. The capacitor according to claim 5, wherein the second crystal grain has a Css-Ccs ratio of 1 to 1.5 inclusive, the Css being a concentration of silicon contained in the shell, the Ccs being a concentration of silicon contained in the core.

* * * * *